United States Patent
Chiu

(10) Patent No.: US 7,958,803 B2
(45) Date of Patent: Jun. 14, 2011

(54) WIRE-STRIPPING PLIERS

(76) Inventor: Te-Huang Chiu, Tungluo Township, Miaoli County (TW)

( * ) Notice: Subject to any disclaimer, the term of this patent is extended or adjusted under 35 U.S.C. 154(b) by 92 days.

(21) Appl. No.: 12/382,256

(22) Filed: Mar. 12, 2009

(65) Prior Publication Data

US 2010/0229690 A1 Sep. 16, 2010

(51) Int. Cl.
*H02G 1/12* (2006.01)
*B26B 27/00* (2006.01)

(52) U.S. Cl. ............................................ 81/9.4; 30/90.1
(58) Field of Classification Search ...................... 81/9.4, 81/9.44; 30/90.1, 91.2, 235, 280, 281
See application file for complete search history.

(56) References Cited

U.S. PATENT DOCUMENTS

| | | | | |
|---|---|---|---|---|
| 560,524 A * | 5/1896 | McMurtrie | .................... | 30/90.6 |
| 562,097 A * | 6/1896 | Rieckel | .......................... | 30/90.7 |
| 927,345 A * | 7/1909 | Furlong | ........................ | 30/90.9 |
| 4,785,535 A * | 11/1988 | Nespor | .......................... | 30/90.1 |
| 7,216,431 B2 * | 5/2007 | Holliday et al. | ............... | 30/90.7 |

* cited by examiner

*Primary Examiner* — David B Thomas
(74) *Attorney, Agent, or Firm* — Rosenberg, Klein & Lee

(57) ABSTRACT

A wire-stripping pliers is disclosed to include a cutter holder fixedly provided at the upper clamping jaw of the pliers body thereof, a curter blade fixedly mounted on the cutter holder, a support rod fixedly provided at the lower clamping jaw of the pliers body and movable with the lower clamping jaw relative to the cutter blade, and a sleeve rotatably mounted on the support rod for supporting an electric wire for cutting by the cutter blade.

3 Claims, 3 Drawing Sheets

WIRE-STRIPPING PLIERS

BACKGROUND OF THE INVENTION

1. Field of the Invention

The present invention relates to pliers and more particularly, to a wire-stripping pliers for stripping off the insulative jacket of an electric wire.

2. Description of the Related Art

Many wire-stripping pliers are commercially available. These conventional wire-stripping pliers simply can strip off a short length of the insulative jacket of an electric wire during each wire-stripping operation. It takes much time and labor to strip off a length of the insulative jacket of an electric wire with a pair of conventional wire-stripping pliers. There are known wire-stripping machines practical for stripping off the insulative jackets of electric wires. However, these wire-stripping machines commonly have a complicated structure. Further, these wire-stripping machines commonly are quite expensive, not suitable for home use.

SUMMARY OF THE INVENTION

The present invention has been accomplished under the circumstances in view. It is one object of the present invention to provide a wire-stripping pliers, which is convenient for use to strip off the insulative jacket of an electric wire with less effort. To achieve this and other objects of the present invention, the wire-stripping pliers comprises a cutter holder fixedly provided at an upper clamping jaw of a pliers body thereof, a curter blade fixedly mounted on the cutter holder, a support rod fixedly provided at a lower clamping jaw of the pliers body and movable with the lower clamping jaw relative to the cutter blade, and a sleeve rotatably mounted on the support rod for supporting an electric wire for cutting by the cutter blade.

DETAILED DESCRIPTION OF THE PREFERRED EMBODIMENT

Figure 1:
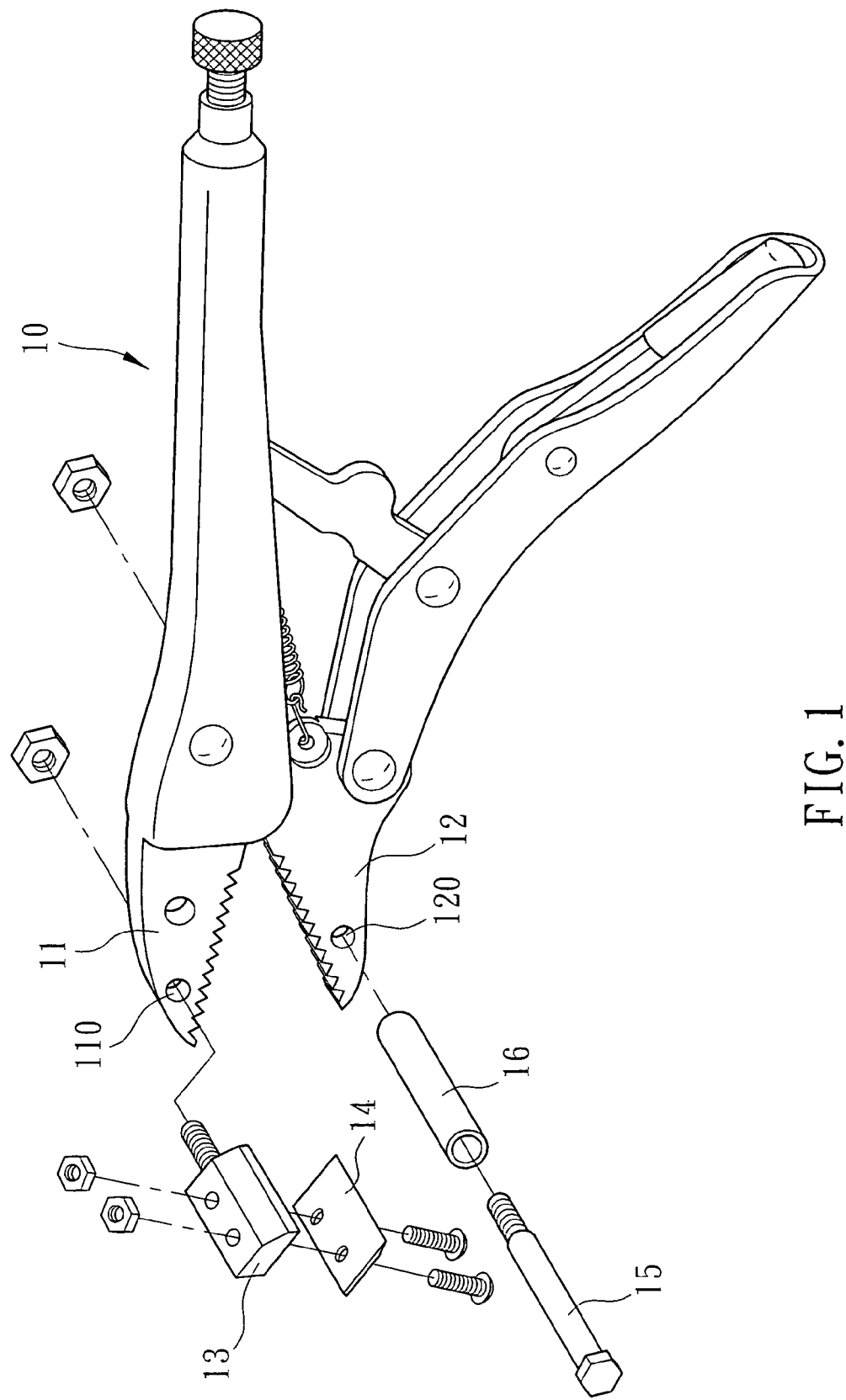
FIG. 1 is an exploded view of a wire-stripping pliers in accordance with the present invention.
Figure 2:
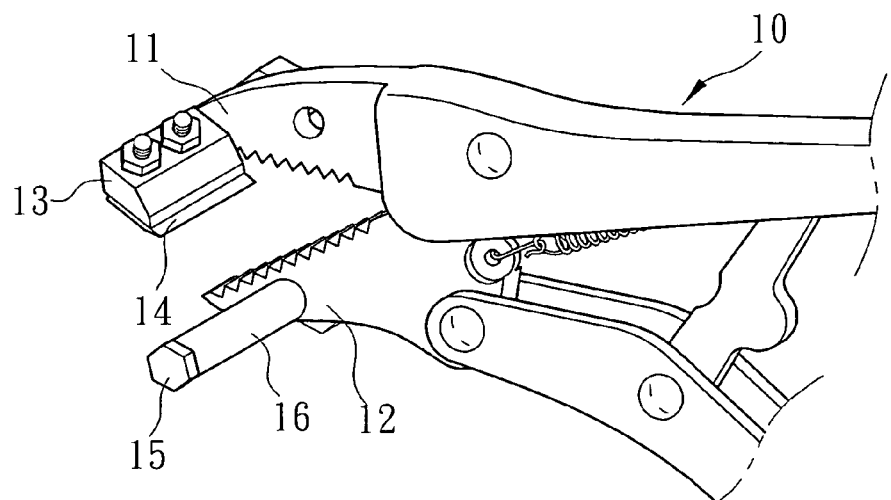
FIG. 2 is an elevational assembly view of the wire-stripping pliers in accordance with the present invention.
Figure 3:
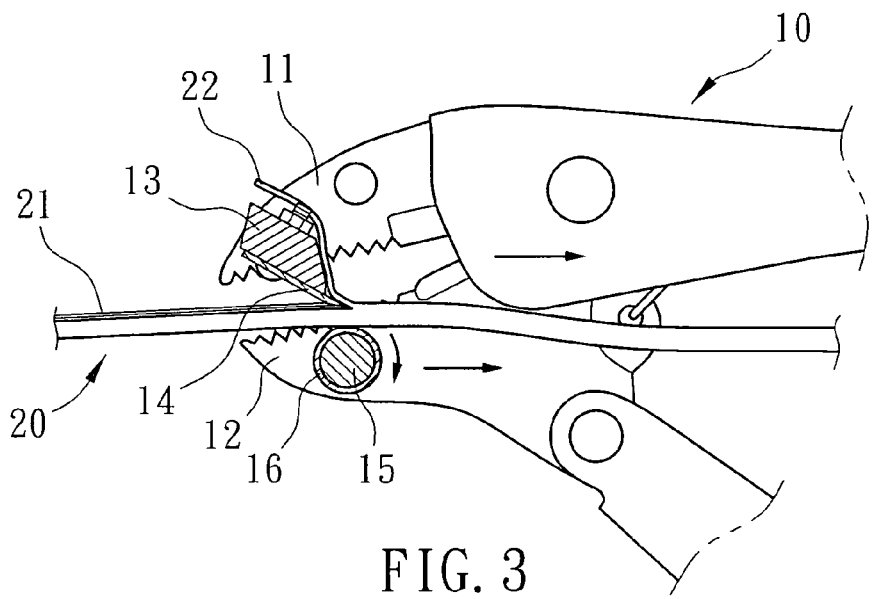
FIG. 3 is a schematic drawing showing a wire-stripping operation of the wire-stripping pliers.

Referring to FIGS. 1~3, a wire-stripping pliers 10 is shown having a cutter holder 13 affixed to an upper clamping jaw 11 thereof to hold a cutter blade 14 and a support rod 15 affixed to a lower clamping jaw 12 thereof for supporting an electric wire 20 for enabling the cutter blade 14 to be moved with the upper clamping jaw 11 relative to the lower clamping jaw 12 to cut open the insulative jacket 22 of the electric wire 20.

The upper clamping jaw 11 has a mounting through hole 110. The cutter holder 13 is fixedly fastened to the mounting through hole 110 of the upper clamping jaw 11 by means of a screw and a nut. The lower clamping jaw 12 has a mounting through hole 120. The support rod 15 is fixedly fastened to the mounting through hole 120 of the lower clamping jaw 12 with screws and nuts. Further, a sleeve 16 is rotatably sleeved on the support rod 15.

Figure 4:
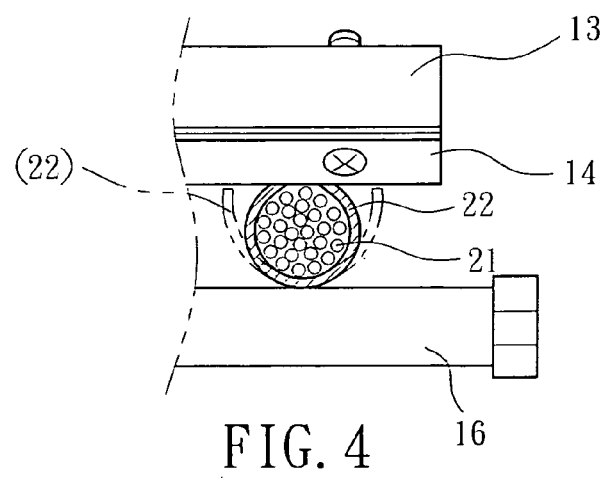
FIG. 4 is a schematic side view showing the cutter blade of the wire-stripping pliers cut into the insulative jacket of the electric wire and the insulative jacket opened from the conductor of the electric wire.

Referring to FIG. 4 and FIG. 3 again, the electric wire 20 to be stripped is set between the cutter blade 14 and the sleeve 16, and then the wire-stripping pliers 10 is operated to move the upper clamping jaw 11 and the lower clamping jaw 12 toward each other. At this time, the cutter blade 14 is moved with the upper clamping jaw 11 toward the sleeve 16 to cut into the insulative jacket 22 of the electric wire 20. When moving the wire-stripping pliers 10 relative to the electric wire 20 at this time, the cutter blade 14 is forced to cut open the insulative jacket 22, and therefore the insulative jacket 22 can easily be removed from the conductor 21 of the electric wire 20.

Figure 5:
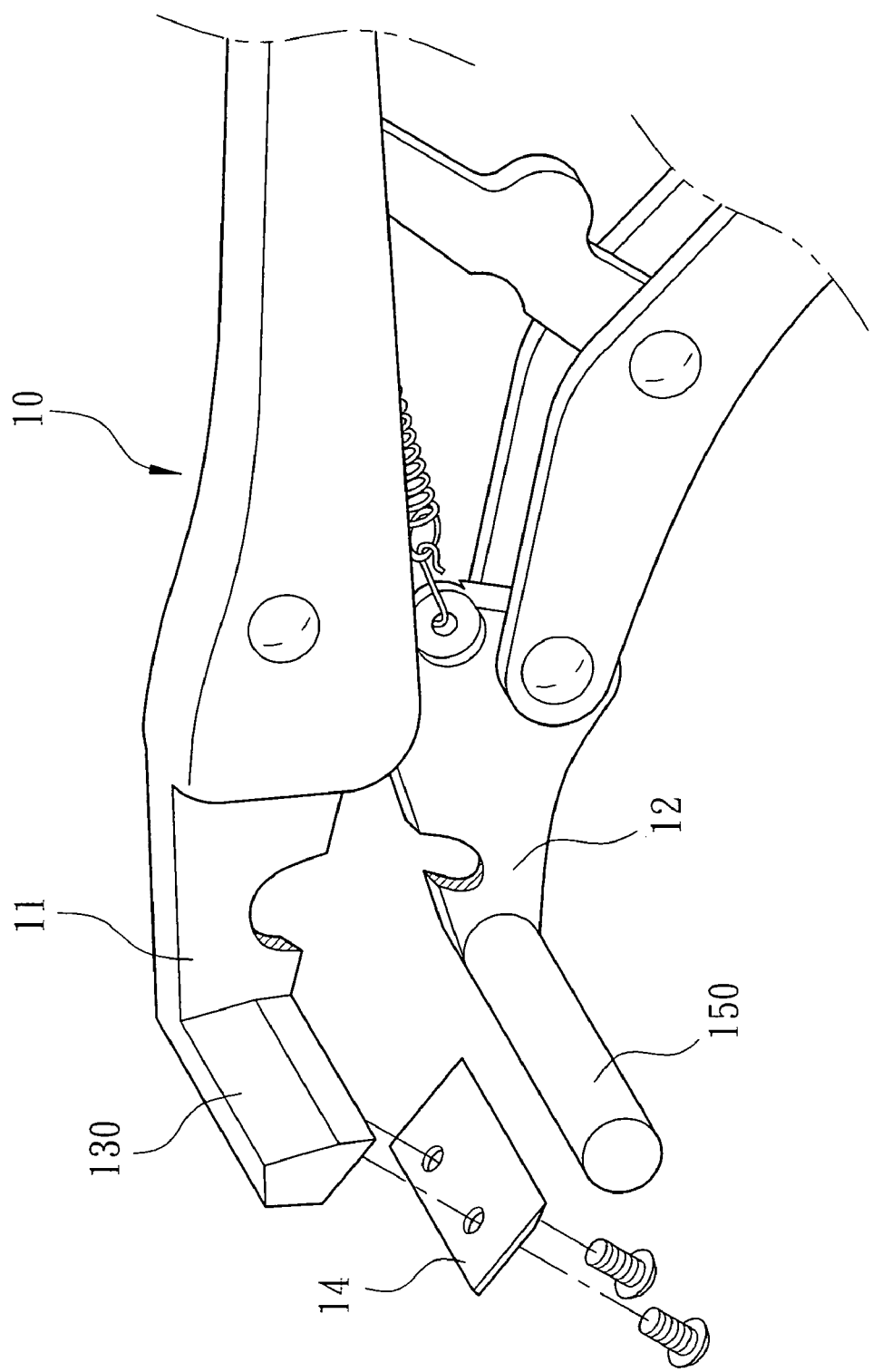
FIG. 5 is an exploded view of an alternate form of the wire-stripping pliers in accordance with the present invention.

FIG. 5 shows an alternate form of the present invention. According to this alternate form, a cutter holder 130 is formed integral with the upper clamping jaw 11 of the wire-stripping pliers 10, a cutter blade 14 is fastened to the cutter holder 130 with screws, and a support rod 150 is formed integral with the lower clamping jaw 11 corresponding to the cutter blade 14 at the cutter holder 130. This alternate form achieves the same effect.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A wire-stripping pliers, comprising a cutter holder fixedly provided at an upper clamping jaw of a pliers body thereof, a planar cutter blade fixedly mounted on said cutter holder being disposed orthogonally to said clamping jaw, a support rod fixedly provided at a lower clamping jaw of said pliers body and movable with said lower clamping jaw relative to said cutter blade, and a sleeve rotatably mounted on said support rod for supporting an electric wire for longitudinal shaving by said cutter blade.

2. The wire-stripping pliers as claimed in claim 1, wherein said upper clamping jaw comprises a mounting through hole for the mounting of said cutter holder; said lower clamping jaw comprises a mounting through hole for the mounting of said support rod.

3. The wire-stripping pliers as claimed in claim 1, wherein said cutter holder and said support rod are respectively formed integral with said upper clamping jaw and said lower clamping jaw.

* * * * *